UNITED STATES PATENT OFFICE.

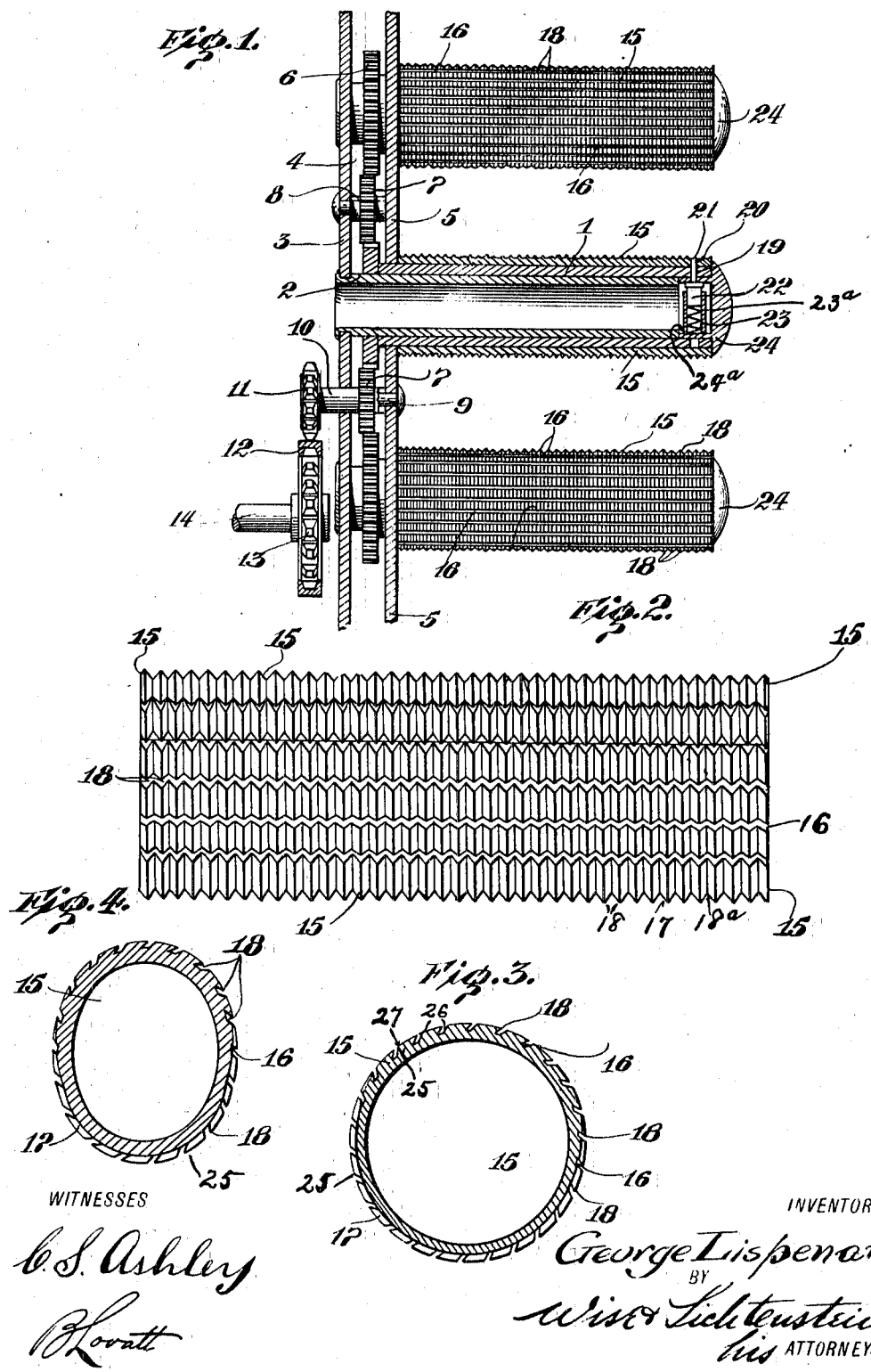

GEORGE LISPENARD, OF NEW YORK, N. Y., ASSIGNOR TO S. K. LICHTENSTEIN, TRUSTEE, OF NEW YORK, N. Y.

HARVESTER PICKER-STEM.

1,059,478.  Specification of Letters Patent.  Patented Apr. 22, 1913.

Application filed November 14, 1910. Serial No. 592,170.

*To all whom it may concern:*

Be it known that I, GEORGE LISPENARD, a citizen of the United States, and a resident of the city of New York, borough of Brooklyn, in the county of Kings and State of New York, have invented certain new and useful Improvements in Harvester Picker-Stems, of which the following is a specification.

My invention relates to improvements in picker stems for cotton harvesters and more particularly to the type of picker stem which is revolubly mounted upon the picking belt of a cotton harvester and adapted to remove the ripe cotton from the bolls of the cotton plants while the vehicle which carries the picking belts travels along the row of plants.

One of the objects of my invention is to provide a picker stem for cotton harvesters which will pick a larger proportion of the cotton than any heretofore used and one which will in no way injure the plant or any of its parts.

The present picker stem when presented in proximity to the plant and revolved to pick the cotton from the boll will in no way injure the plant nor will it injure any part of the plant while it is being presented to and removed from, the plant. Heretofore cotton picker stems have been built up of a cylindrical body having a flange or flanges extending outwardly some distance from the periphery, which flanges were provided with slots to form engaging edges for picking the cotton; and while such stems are capable of picking a certain amount of cotton they have not satisfactorily accomplished their purpose. Such stems are apt to and do, fail to pick considerable of the cotton and they are apt to injure the plant because of the engagement of the latter with the flanges as the stem moves into and out of the plant for the picking operation. That is, the flanges drag parts of the plant and cause injury to the latter and to the picker stems or their mounting.

One of the objects of my present invention is to provide a single unit stem preferably of cylindrical form, grooved circumferentially to form a thread around its outer surface and to provide a plurality of slots which intersect the thread in such a manner as to form picking teeth which do not extend beyond the peripheral limits of the thread. The slots are formed at such an angle that the teeth will be pitched in such a manner that the picker will remove the ripe cotton from the bolls when the picker is revolved in one direction and will discharge the cotton so picked when the stem is revolved in a reverse direction. The thread is so shaped and arranged that the teeth formed by the intersecting slots will more perfectly pick the cotton from the bolls than was heretofore possible.

Another branch of my invention relates to the formation and mounting of the stem whereby it will have a proper support upon the picking belt and whereby the stem may be very easily removed from the belt for repairs.

In the drawings forming a part of this application, Figure 1, is a vertical sectional view of a supporting bar which forms part of the picker belt of a cotton harvester, having mounted thereon my improved picker stem, Fig. 2, is a view in elevation of the stem, showing the face thereof, Fig. 3, is a cross section of the picker stem, and Fig. 4, is a similar view of a modified form of stem showing the same formed of elliptical shape in cross section.

The picker stem proper is preferably formed as a cylindrical or elliptical body and mounted upon a supporting member. In the drawings I have shown a cylindrical rotative sleeve 1, mounted on a bearing 2, which latter is rigidly mounted in the rear plate 3, of the picker belt. The picker belt consists of inner and outer plates 3 and 5, connected by end plates 4, and between the plates 3 and 5, are mounted pinions 7, supported upon studs 8, secured between the plates. The sleeve 1, extends through the plate 5 and secured upon its inner ends and lying between the plates 3 and 5, of the picker belt is a gear 6, by means of which the rotative movement is imparted to the picker stems. The pinions 7 and gears 6, mesh with each other and form a train of gears for operating the several stems on a belt section in unison. On the stud 9, which is secured to the front plate 5, is arranged a sleeve 10, which revolves on the stud and which extends through the plate 3. The pinion 7, on the sleeve 10 meshes with the gears 6, the same as the other pinions 7. Upon the end of the sleeve 10, outside the plate 3, there is provided a sprocket 11, which is operated by a chain 12, traveling over the sprocket 13, on a shaft 14, forming part of the picker stem operating mechanism of the cotton harvester.

The picker stem proper preferably consists of a cylindrical body 15, which fits over the sleeve 1, whereby the member 2, will form a bearing for the stem substantially the length of the latter. The stem is removable from its bearing whereby the several stems may be independently removed from the picker belt, in case of injury to any individual stem. For this purpose I provide a cap 24, which extends over the ends of the sleeve 1, and stem 15 and a cylindrical portion 24ª thereof fits into the end of the sleeve and abuts against the end of the bearing. In a casing 23ª arranged laterally in the cylindrical portion 24ª is arranged a coil spring 23, which presses outwardly on a locking pin 22. The smaller end 21, of the locking pin extends through apertures 19 and 20 in the sleeve 1, and stem 15 respectively, which apertures register with each other when the stem is in place. The cap therefore locks the stem and sleeve and protects the parts from dust. To remove a picker stem from the belt it is only necessary to press the pin 21, to disengage the same from the sleeve and picker stem and the cap and stem will then slide off.

The picker stem 15, itself consists of a unit having a grooved surface forming circumferential raised portions preferably in the nature of a thread. In the preferred form of my invention a groove 17 is formed circumferentially around the stem and is preferably a continuous spiral, forming a raised thread 18, between the several convolutions of the groove. The raised portions 18, therefore are on an arc substantially at right angles to the axis of the stem, being pitched only sufficiently to form a continuous thread through the length of the stem. It is not absolutely necessary that the thread be a single continuous one, but it is preferable because it is cheaper to make and because it is easier to discharge the picked cotton therefrom. The thread 18, is wider at its base 18ª and diminishes in width to the periphery where it is very narrow, and is preferably but an edge.

In addition to the circumferential groove and thread I have provided slots 16, which are cut through the thread and intersect the grooves 17; and preferably these slots are formed continuous from end to end of the stem and parallel with the axis thereof. Wherever the slot 16 passes through the thread 18, there is formed a picking tooth 25 so that the intersecting slots and grooves form rows of picking teeth the points of which coincide with the periphery of the picker stem and therefore do not extend beyond the periphery of the thread.

There are preferably a number of such slots 16, formed at intervals on the surface of the stem so that there will be formed a large number of teeth on the stem. Since the thread tapers to a narrow or even sharp top edge, the teeth 25, will be pointed and this materially improves the picking qualities because the teeth more readily take hold of the delicate fibers of the cotton, even though the contact between the cotton and stem be very light.

The shape and disposition of the slots 16, materially affect the efficiency of the picker stem. These slots are here shown as directed inwardly from the periphery of the picker stem at an angle to the radii of the stem, or as may be said, at an angle to radial planes of the stem. This causes the several teeth 25, to be inclined so that they will pick the cotton when revolved in one direction and release the same when revolved in a reverse direction. The slots 16, are here shown as being defined by straight parallel walls 26 so that the width of the slot is uniform throughout its depth. This permits the slots to be cut very narrow and at the proper angle and furnishes the most efficient form of picking tooth. The space between the point of a tooth and the top 27 of a slot is very narrow and the width of the slot is uniform, giving the best picking and discharging results. The teeth obtain the quickest and best hold upon the cotton fibers and the slot is of such shape as to permit a quick discharge of the cotton when revolved in a reverse direction for that purpose.

When the picker stem is presented in proximity to the cotton boll and revolved, the cotton fibers may contact with the tops of the thread 18, and the picker teeth 25, will take quick hold of the cotton even though the contact between the picker and cotton be very light; and as the teeth do not extend beyond the periphery of the thread no injury will result to the cotton plant or any part thereof with which the stem may contact, especially if the slots 16, are very narrow. When the stem is carried away from the plant and revolved in a direction reverse to the picking movement, the stem will discharge its cotton readily, simply as a result of its revolution.

As the several convolutions of the thread 18, are close and the threads are of comparatively slight depth there will be no injury to the plant as the stem is presented to and removed from the plant.

Having described my invention what I claim is:—

1. A picker stem for cotton harvesters, comprising a substantially circular body grooved circumferentially to form peripheral threads, and having narrow slots of uniform width cut in the said threads, said slots dividing the threads and intersecting said peripheral grooves, to form picker teeth coinciding with the periphery of said threads.

2. A picker stem for cotton harvesters, comprising a substantially circular body, grooved circumferentially to form peripheral threads in close proximity with each other and decreasing in width toward their periphery to form narrow top edges, said body having substantially longitudinal narrow slots of uniform width cut through and dividing said threads and intersecting said peripheral grooves to form pointed picker teeth coinciding with the periphery of said threads.

3. A picker stem for cotton harvesters, comprising a substantially circular body, grooved circumferentially to form peripheral threads in close proximity with each other and decreasing in width toward their periphery to form top edges, said body having substantially longitudinal slots having straight parallel side walls, cut through and dividing said threads and intersecting said peripheral grooves to form pointed picker teeth coinciding with the periphery of said threads, said slots being cut obliquely to radii of said body adjacent thereto, whereby said teeth will be undercut.

4. A picker stem for cotton harvesters, comprising a substantially circular elongated body having a spiral groove disposed circumferentially around the same substantially at right angles to the axis of the body and extending substantially the length of the picker, and forming a circumferential thread on said body of triangular cross section, said body having narrow longitudinal slots cut through and dividing said thread and intersecting said groove, to form pointed teeth coinciding with the periphery of the thread, said slots being defined by straight parallel side walls whereby the slots will be of uniform width and said slots being directed obliquely to radii of said body adjacent thereto whereby the said teeth will be undercut.

In testimony whereof I have hereunto signed my name in the presence of two subscribing witnesses.

GEORGE LISPENARD.

—Witnesses:
W. T. ASHLEY,
MARGARITA A. GORDON.